US 6,181,242 B1

(12) United States Patent
Nguyen

(10) Patent No.: US 6,181,242 B1
(45) Date of Patent: Jan. 30, 2001

(54) ADJUSTABLE REARVIEW MIRROR VEHICLE INFORMATION DISPLAY

(75) Inventor: Hue T. Nguyen, Shelby Township, MI (US)

(73) Assignee: General Motors Corporation, Detroit, MI (US)

(*) Notice: Under 35 U.S.C. 154(b), the term of this patent shall be extended for 0 days.

(21) Appl. No.: 09/438,613

(22) Filed: Nov. 12, 1999

(51) Int. Cl.[7] .................................................... B60Q 1/00
(52) U.S. Cl. .......................... 340/461; 340/438; 340/439; 248/475.1; 248/479; 248/484
(58) Field of Search .................................. 340/461, 468, 340/438, 449, 479; 248/475.1, 476, 479, 484; D12/187, 189; 362/494

(56) References Cited

U.S. PATENT DOCUMENTS

| 4,930,742 | 6/1990 | Schofield et al. | 248/475.1 |
| 5,223,814 | * 6/1993 | Suman | 340/525 |
| 5,253,115 | 10/1993 | Ueno | 359/838 |
| 5,408,357 | 4/1995 | Beukema | 359/493 |
| 5,455,716 | 10/1995 | Suman et al. | 359/838 |
| 5,576,687 | 11/1996 | Blank et al. | 340/438 |
| 5,631,638 | 5/1997 | Kaspar et al. | 340/902 |
| 5,708,410 | 1/1998 | Blank et al. | 340/438 |
| 5,788,358 | * 8/1998 | Davis | 362/83.1 |
| 5,790,973 | * 8/1998 | Blaker et al. | 701/123 |

* cited by examiner

Primary Examiner—Julie Lieu
(74) Attorney, Agent, or Firm—Jeffrey A Sedlar

(57) ABSTRACT

An interior rearview mirror assembly having an adjustable information display device. The display device rotates independently of the rearview mirror to allow both the driver and the front passengers to observe the display when the rearview mirror is rotated toward the driver. The display device displays information about various vehicle systems. The rearview mirror assembly includes a mirror housing for holding a rearview mirror. The mirror housing is pivotally mounted on the windshield of the vehicle so that the rearview mirror is adjustable by the driver into a desired position. The information display device is pivotally mounted on a top or bottom side of the mirror housing to allow the display device to rotate independently of the mirror housing. The display device is attached to the mirror housing through a hollow tubular support arm which has opposite first and second ends, one of the ends being attached to the display device. A pivotal connection is disposed at the other end for rotating the information display device between various positions. Electrical wires are disposed within the hollow tubular support arm and connected to the display device for providing electrical power to the information display device. A stop element engages the pivotal connection to limit the angle of rotation of the connection.

5 Claims, 2 Drawing Sheets

ADJUSTABLE REARVIEW MIRROR VEHICLE INFORMATION DISPLAY

TECHNICAL FIELD

This invention relates to vehicle information displays, and more particularly to an interior rearview mirror assembly having an information display that rotates independently of the rearview mirror to allow the driver and front passengers to observe the display simultaneously.

BACKGROUND OF THE INVENTION

It is known in the art relating to vehicle information display to typically display information concerning the operation of the vehicle, time, outside temperature and the like, in the vehicle instrument panel. In order to view any one or more of the displays in the panel, the driver must look down to the panel. The location of the information displays in the vehicle instrument panel is usually only observable by the driver.

To correct this situation, information displays have been mounted on or in the interior rearview mirror assembly of the vehicle. In one application, the display was located behind the prism of the interior rearview mirror assembly. In another application, the information display was mounted on or in the mirror frame so as not to interfere with the field of view of the mirror. With these types of rearview mirrors, the display moves or rotates with the mirror. A problem with these types of configurations is that when the rearview mirror is rotated toward the driver, the display is rotated away from other front passengers. Therefore, there is a need for a rearview mirror assembly that allows the displayed information to be positioned for maximum simultaneous observation by both the driver and front passengers.

SUMMARY OF THE INVENTION

The present invention provides an interior rearview mirror assembly having an information display device mounted thereon. The information display device rotates independently of the rearview mirror to allow both the driver and the front passengers to observe the display simultaneously.

The interior rearview mirror assembly includes a mirror housing for holding a rearview mirror or other type of reflective element. The mirror housing has a top side and a bottom side. The mirror housing is pivotally mounted to the vehicle to allow the mirror housing to be adjusted by the driver into a desired position. The information display device may be mounted on the top or bottom side of the mirror housing. The display device has a display window to display the status of various vehicle systems. For example, the display device may include a speed indicator, odometer, clock, trip computer, or the like. The display device is pivotally mounted on the mirror housing such that the display may be rotated independently of the mirror housing which allows the display window to be observable by the driver and the front passengers of the vehicle. Further, the assembly mounting limits the pivotal motion of the display device to help maintain this display in a position that is visible to all front passengers and to avoid twisting and damaging of the electrical wires connected between the display device and a remote power source.

The display device is attached to the mirror housing through a hollow tubular support arm which has opposite first and second ends. One of the ends is attached to the mirror housing. A pivotal connection is disposed at the other end for rotating the information display device between various positions. Electrical wires extend through the hollow tubular support arm and connect the display device to the various systems of the vehicle and a power source. A stop element engages the pivot connection to limit the angle of rotation of the connection thereby limiting pivotal motion.

These and other features and advantages of the invention will be more fully understood from the following description of certain specific embodiments of the invention taken together with the accompanying drawings.

DESCRIPTION OF THE PREFERRED EMBODIMENT

Figure 1:
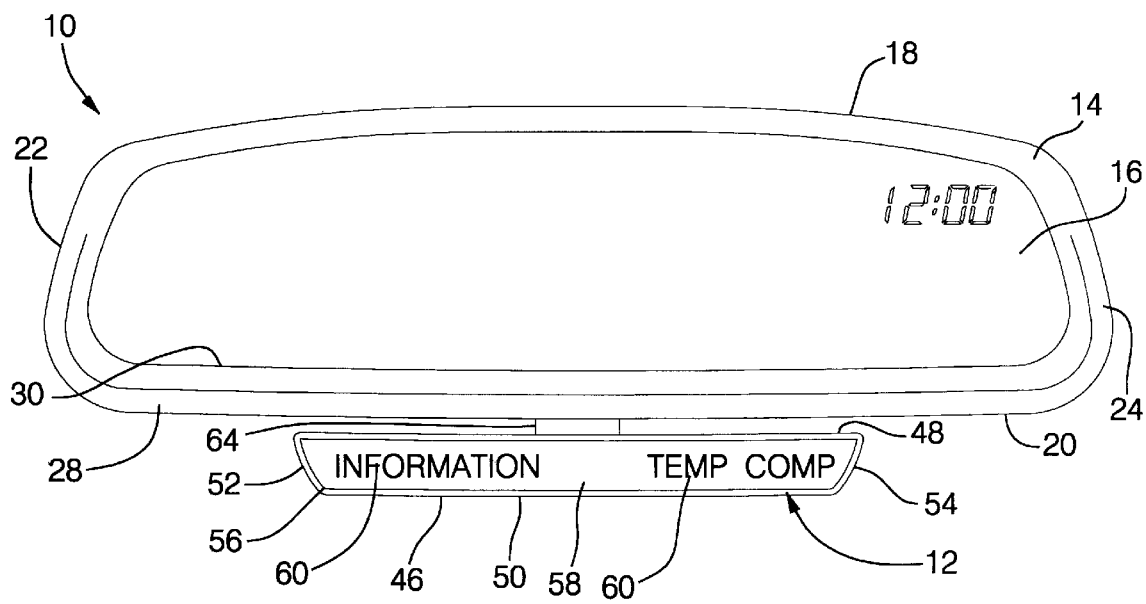
FIG. 1 is a face view of an interior rearview mirror assembly in accordance with the present invention.
Figure 2:
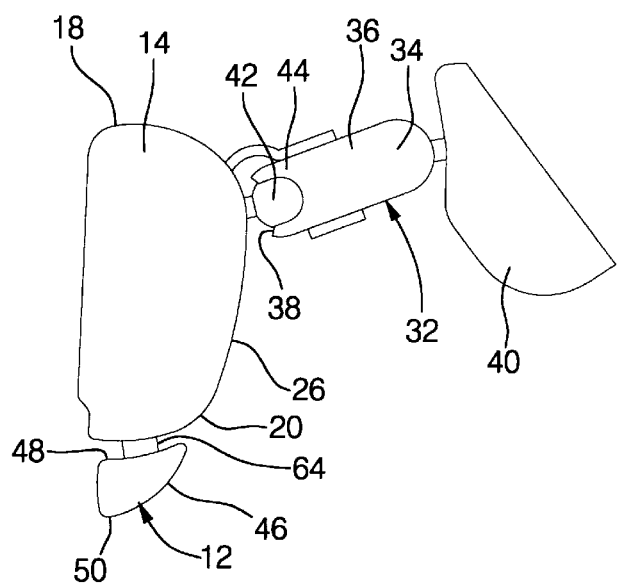
FIG. 2 is a side view of the interior rearview mirror assembly of FIG. 1.

Referring to FIGS. 1 and 2 of the drawings in detail, numeral 10 generally indicates an interior rearview mirror assembly for an automotive vehicle. The assembly 10 includes an information display device 12 that displays various information about the operation of the vehicle, time and outside temperature and the like. The information display device 12 is observable by the driver and the front passengers. This is accomplished by having the information display device 12 rotate independently of the rearview mirror such that when the rearview mirror is directed toward the driver, the display may be pivoted to be more clearly observable by other front passengers of the vehicle.

The interior rearview mirror assembly 10 includes a mirror housing 14 holding a rearview mirror 16 pivotally mounted to a windshield of the vehicle (not shown) and a display device 12 pivotally mounted to the mirror housing 14. The mirror housing 14 may be molded as a single piece from a plastic material and generally includes a top wall 18, a bottom wall 20, side walls 22, 24 and a back wall 26. Each of the walls terminates inwardly to form a rim 28 therealong. The rim 28 holds the mirror 16 which can be observed through a front opening 30 defined by the rim 28.

The mirror housing 14 is mounted on the windshield by support means 32. The support means 32 may include a spherical socket which receives a spherical head of a ball at one end 34 of a support arm 36 that extends through an opening 38 in the back wall 26 of the mirror housing 14. The support arm 36 extends out of the mirror housing 14 and is pivotally connected to a base 40 that is mountable on the windshield of the vehicle. The support means 32 and base 40 may also be molded from a plastic material. The mirror housing 14 is adjustable into various positions about the spherical head and pivotal mounting for providing the desired rear view of the vehicle. The mirror housing 14 may also be adjustable about a pivotal connection 42 at the other end 44 of the support arm 36. The pivotal connection 42 may include a spherical socket located inside of the mirror housing 14 which receives a spherical head of a ball at end 44 of the support arm 36.

Figure 3:
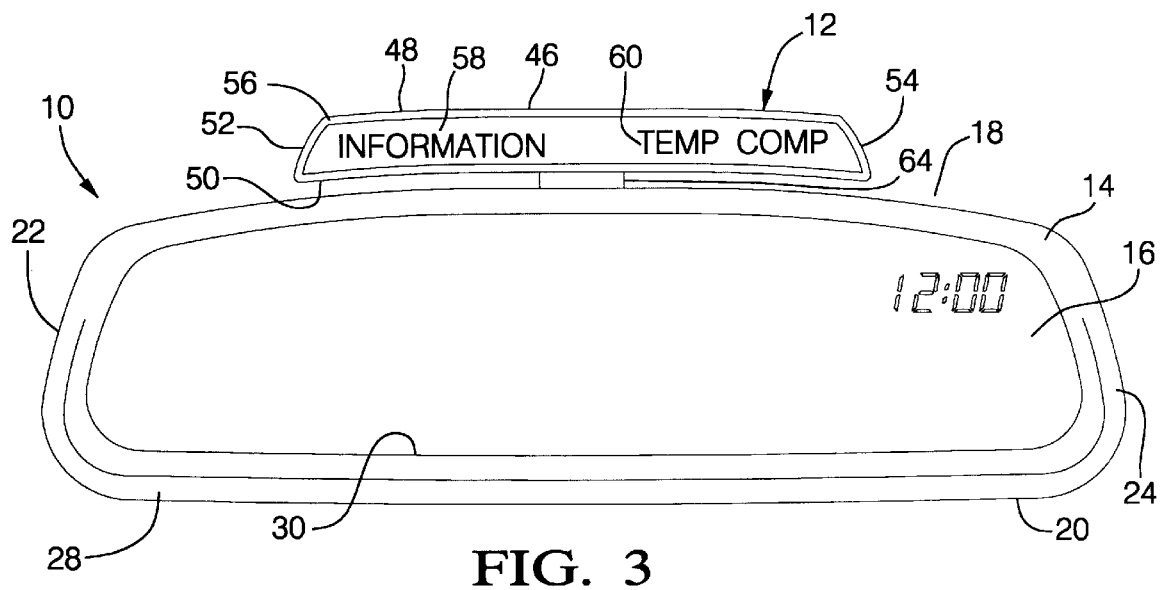
FIG. 3 is a face view of an interior rearview mirror assembly in accordance with an alternative embodiment of the present invention.
Figure 4:
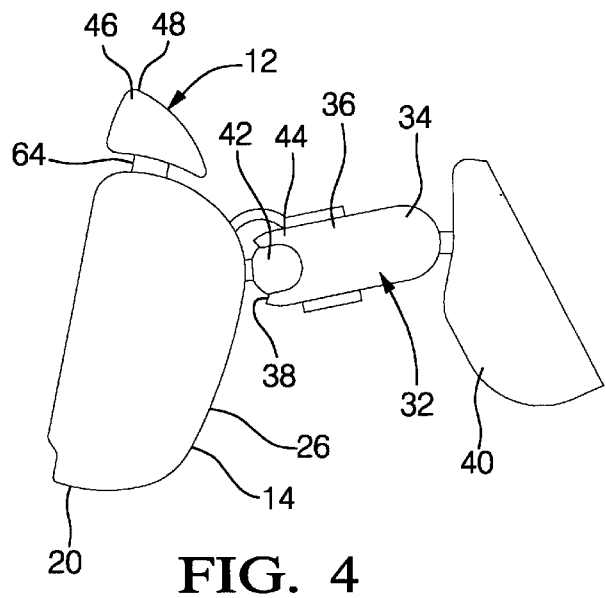
FIG. 4 is a side view of the interior rearview mirror assembly of FIG. 3.

In FIGS. 1 and 2 the information display device 12 is mounted on the bottom wall 20 of the mirror housing 14. Alternatively, the information display device 12 may be mounted on the top wall 18 of the mirror housing 14 as shown in FIGS. 3 and 4 wherein like numerals indicate like parts.

The display device 12 includes a display housing 46 that is generally rectangular in shape and is molded as a single piece from a plastic material. The housing 46 has top, bottom and side walls 48,50,52,54 that terminate inwardly to form a frame 56 which defines a display window 58. An interface circuit (not shown) is disposed within the display housing 46 to operate the information display device 12. The circuit may be connected to a microprocessor or other such device to receive the necessary signals indicating the information to be displayed. The circuit is also connected to a display element 60 such as a liquid crystal display, light-emitting diode or fluorescent element which displays the status of various vehicle systems. For example, the display device 12 may include a speed indicator, odometer, clock, trip computer, or the like. The display element 60 is disposed within the display housing 46 and positioned within the display window 58.

Figure 5:
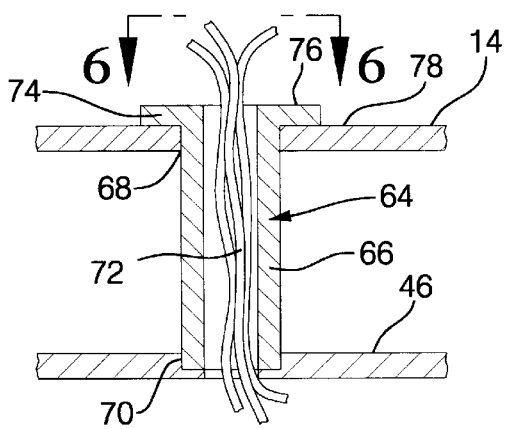
FIG. 5 is a cross-sectional view through a pivotal connection between a mirror housing and an information display device in accordance with the invention.
Figure 6:
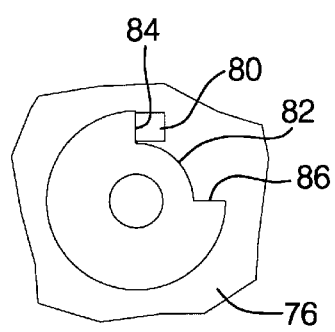
FIG. 6 is an end view of the pivotal connection from line 6—6 in FIG. 5.

The information display device 12 is connected to the mirror housing 14 by pivotal attachment means 64. Referring to FIGS. 5 and 6, the attachment means 64 may be a hollow tubular support arm 66 having opposite first and second ends 68,70. End 68 is attached to the mirror housing 14 and end 70 is attached to the display housing 46. Electrical wires 72 that connect the display device 12 to a power source (not shown) extend through the support arm 66.

A pivotal connection 74 is formed at end 68 for rotating the information display device 12 between various positions. The pivotal connection 74 includes a rim 76 extending outwardly from end 68 and abutting an outer surface 78 of the mirror housing 14. A stop element 80 extends from the surface 78 into a slot 82 that is formed on a section of the rim 76. When the support arm 66 is twisted, the stop element 80 engages sides 84,86 of the slot 82 and limits rotational movement of the support arm 66, thus preventing rotation of information display device 12 to the left in excess of a position that is substantially parallel to the morrow. It has been found that this maintains visibility to all front seat passengers until the mirror housing 14 is in a typical functional position.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An interior rearview mirror assembly for a vehicle comprising:

a mirror housing for holding a rearview mirror;

support means for pivotally mounting said mirror housing to the vehicle so that the rearview mirror is adjustable by the driver into a desired position;

an information display device mounted to said mirror housing, said information display device including a display window such that the display is viewable only from the front side of mirror housing at which the mirror is mounted; and attachment means for pivotally mounting said information display device to said mirror housing so that said information display device is rotatable independently of the mirror housing and is optimally observable by the driver and front passengers of the vehicle simultaneously.

2. An interior rearview mirror assembly as in claim 1 wherein the attachment means includes:

a hollow tubular support arm having opposite first and second ends, one of said ends being attached to the mirror housing and the other end to the display device;

a pivotal connection formed at one of said ends for rotating the information display device between various positions;

electrical wires disposed within said hollow tubular support arm and connected to said display device for providing electrical power to said information display device; and a stop element engagable by said pivotal connection and limiting the angle of rotation of the connection.

3. An interior rearview mirror assembly as in claim 2 wherein the pivotal connection is disposed on the mirror housing.

4. An interior rearview mirror assembly as in claim 1 wherein said mirror housing includes a top wall and the information display device is mounted on the top wall of the mirror housing.

5. An interior rearview mirror assembly as in claim 1 wherein said mirror housing includes a bottom wall and the information display device is mounted on the bottom wall of the mirror housing.

* * * * *